United States Patent [19]

Valyocsik

[11] Patent Number: 4,639,360
[45] Date of Patent: Jan. 27, 1987

[54] SYNTHESIS OF CRYSTALLINE SILICATE ZSM-5 USING AN ORGANIC SULFONIC ACID

[75] Inventor: Ernest W. Valyocsik, Yardley, Pa.

[73] Assignee: Mobil Oil Corporation, New York, N.Y.

[21] Appl. No.: 791,658

[22] Filed: Oct. 28, 1985

[51] Int. Cl.[4] .............................................. C01B 33/28
[52] U.S. Cl. .................................... 423/329; 423/328; 556/173
[58] Field of Search ....................... 423/328 T, 329 T; 556/173

[56] References Cited

U.S. PATENT DOCUMENTS

| | | | |
|---|---|---|---|
| 3,247,195 | 4/1966 | Kerr | 423/328 T |
| 3,702,886 | 11/1972 | Argauer et al. | 423/328 T |
| 4,427,788 | 1/1984 | Miale et al. | 423/328 T |

FOREIGN PATENT DOCUMENTS

| | | | |
|---|---|---|---|
| 0059059 | 9/1982 | European Pat. Off. | 423/328 T |
| 1567948 | 5/1980 | United Kingdom | 423/328 T |

*Primary Examiner*—John Doll
*Assistant Examiner*—Lance Johnson
*Attorney, Agent, or Firm*—Alexander J. McKillop; Michael G. Gilman; Dennis P. Santini

[57] ABSTRACT

This invention relates to a new form of crystalline silicate identified as zeolite ZSM-5, to a new and useful improvement in synthesizing said crystalline silicate and to use of said crystalline silicate prepared in accordance herewith as a catalyst for organic compound, e.g. hydrocarbon compound, conversion.

24 Claims, No Drawings

SYNTHESIS OF CRYSTALLINE SILICATE ZSM-5 USING AN ORGANIC SULFONIC ACID

BACKGROUND OF THE INVENTION

1. Field of the Invention

This invention relates to a new and useful improvement in synthesizing crystalline silicate having the structure of ZSM-5, the new ZSM-5 synthesized, and to use of the crystalline silicate synthesized in accordance herewith as a catalyst component for organic compound, e.g. hydrocarbon compound, conversion.

More particularly, this invention relates to an improved method of preparing crystalline silicate ZSM-5 whereby synthesis is facilitated and reproducible and the silicate product exhibits high purity and catalytic utility.

2. Discussion of Prior Art

Crystalline silicate ZSM-5 and its conventional preparation are taught by U.S. Pat. No. 3,702,886, the entire disclosure of which is incorporated herein by reference. It has a distinctive X-ray diffraction pattern which identifies it from other known crystalline silicates. A crystalline silicate composition having the structure of ZSM-5 is taught in U.S. Pat. No. Re. 29,948, the entire disclosure of which is incorporated herein by reference.

U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a constraint index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonimum hydroxide and ZSM-5 seeds. U.S. Pat. No. 4,100,262 teaches synthesis of ZSM-5 from a reaction mixture comprising a tetraalkylammonium source and a tetraureacobalt (II) complex.

Applicant knows of no prior art for preparing crystalline silicate ZSM-5 utilizing as a directing agent an anionic compound such as an organosulfonic acid as required of the present invention.

SUMMARY OF THE INVENTION

An improved, economical and reproducible method for preparing crystalline silicate identified as zeolite ZSM-5 from aluminum-rich hydrogels exhibiting high purity, catalytic activity and other valuable properties is provided. The method comprises forming a reaction mixture containing sources of alkali metal oxide, an anionic directing agent, an oxide of silicon, an oxide of aluminum and water and having a composition, in terms of mole ratios, within the following ranges:

|  | Broad | Preferred | Most Preferred |
| --- | --- | --- | --- |
| $SiO_2/Al_2O_3$ | 20 to less than 400 | 30 to 200 | 40 to 120 |
| $H_2O/SiO_2$ | 2 to 1000 | 10 to 200 | 20 to 100 |
| $OH^-/SiO_2$ | 0 to 10 | 0.05 to 2 | 0.10 to 1 |
| $M/SiO_2$ | 0.01 to 4 | 0.05 to 2 | 0.10 to 1 |
| $R/SiO_2$ | 0.01 to 4 | 0.02 to 2 | 0.05 to 1 | wherein R is the anion of an organosulfonic acid directing agent, hereafter more particularly described, and M is an alkali metal ion, and maintaining the mixture until crystals of the desired crystalline silicate ZSM-5 are formed. The reaction mixture is aluminum-rich with a $SiO_2/Al_2O_3$ molar ratio of from about 20 to less than about 400, preferably from about 30 to about 200, and most preferably from about 40 to about 120. The quantity of $OH^-$ is calculated only from the inorganic sources of alkali without any organic base contribution.

Reaction conditions required consist of heating the foregoing reaction mixture to a temperature of from about 100° C. to about 220° C. for a period of time of from about 8 hours to about 60 days. A more preferred temperature range is from about 150° C. to about 180° C. with the amount of time at a temperature in such range being from about 12 hours to about 7 days.

The digestion of the gel particles is carried out until crystals form. The solid product comprising ZSM-5 is recovered from the reaction medium, as by cooling the whole to room temperature, filtering and water washing.

Synthetic mordenite is a valuable by-product of the present method at very low reaction mixture $SiO_2/Al_2O_3$ molar ratios. At reaction mixture $SiO_2/Al_2O_3$ molar ratios above about 200, alpha-cristobalite forms, becoming the main crystalline product at a $SiO_2/Al_2O_3$ ratio of 400.

EMBODIMENTS

Zeolite ZSM-5 synthesized by conventional procedure is proven to have catalytic application. When the crystalline silicate is synthesized in accordance with the present method, it exhibits excellent catalytic activity for certain conversions of interest, including hydrocracking and isomerization. Further, the anionic directing agent from the present method is readily commercially available and of lower cost than onium compounds used for that purpose in the prior art. Use of this highly soluble anionic directing agent eliminates the costly unreacted organics recovery problem presently encountered with amines and onium compounds conventionally used in ZSM-5 synthesis.

It is noted that the reaction mixture silica/alumina mole ratio in the present method is critical, since at less than the preferred minimum value of about 30, crystalline material other than ZSM-5 tends to form, and at more than the preferred maximum value of about 200, alpha-crystobalite tends to form.

The particular effectiveness of the presently required unconventional, anionic organosulfonic acid directing agent, hereafter more particularly described, when compared with other directing agents, such as those identified above, is believed due to its ability to function as a template in the nucleation and growth of zeolite ZSM-5 crystals. This is true even though no predigestion of the gel is required prior to crystallization. This different organic directing agent functions in this fashion in an aluminum-rich reaction mixture having a silica/alumina molar ratio of from about 20 to less than about 400, preferably from about 30 to about 200, and most preferably from about 40 to about 120.

The synthesis of the present invention is facilitated when the reaction mixture comprises seed crystals, such as those having the structure of ZSM-5. The use of at least 0.01%, preferably about 0.10%, and even more preferably about 1% seed crystals (based on total weight) of crystalline silicate such as ZSM-5 in the reaction mixture will facilitate crystallization in the present method.

The reaction mixture composition for the synthesis of synthetic crystalline silicate hereby can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing zeolite ZSM-5 can be supplied by one or more essential reactants and they can be mixed together in any order. For example, any oxide can be supplied by an aqueous solution, sodium hydroxide or by an aqueous solution of a suitable silicate. The reaction mixture can be prepared either batchwise or continuously. Crystal size and crystallization time for the product composition comprising ZSM-5 will vary with the exact nature of the reaction mixture employed.

An embodiment of the source of unconventional, anionic directing agent required of the present method is the organosulfonic acid N-2-hydroxyethylpiperazine-N-2-ethanesulfonic acid, which may be structurally represented as follows:

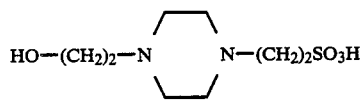

This is a commercially available organosulfonic acid having the trade name "HEPES", available widely, such as from Sigma Chemical Comany, St. Louis, Mo., and U.S. Biochemical Corporation, Cleveland, Ohio. It is used as a biological buffer.

The zeolite ZSM-5 composition as prepared hereby has a characteristic X-ray diffraction pattern in the calcined, sodium-exchanged form, the values of which are set forth in Table 1, hereinafter. The zeolite ZSM-5 composition as prepared hereby can also be identified, in terms of mole ratios of oxides and in the anhydrous state, as follows: (0.005 to 5)R:(0.01 to 5)$M_{2/n}O$:(0.2 to 5)$Al_2O_3$:(100)$SiO_2$ wherein M is at least one cation having a valence n and R is the anion derived from the directing agent source compound, above described. Said anion may be represented by the formula:

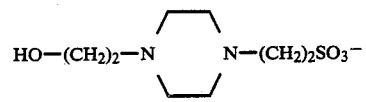

The original "M" cations, e.g. alkali metal, can be replaced, at least in part, by ion exchange with other cations. Thus, the original cations are exchanged into a hydrogen or hydrogen ion precursor form or a form in which the original cation has been replaced by a metal of Groups IIA, IIIA, IVA, IB, IIB, IIIB, IVB, VIB or VIII of the Periodic Table. Thus, for example, it is contemplated to exchange the original cations with ammonium ions or with hydronium ions. Catalytically active forms of these would include, in particular, hydrogen, rare earth metals, aluminum, metals of Groups II and VIII of the Periodic Table and manganese.

The X-ray diffraction pattern of the crystalline silicate identified as zeolite ZSM-5 has the characteristic lines shown in Table 1.

TABLE 1

| Interplanar d-Spacing (A) | Relative Intensity ($I/I_o$) |
|---|---|
| 11.1 ± 0.3 | s |
| 10.0 ± 0.3 | s |
| 7.4 ± 0.2 | w |
| 7.1 ± 0.2 | w |
| 6.3 ± 0.2 | w |
| 6.04 ± 0.2 | w |
| 5.56 ± 0.1 | w |
| 5.01 ± 0.1 | w |
| 4.60 ± 0.08 | w |
| 4.25 ± 0.08 | w |
| 3.85 ± 0.07 | vs |
| 3.71 ± 0.05 | s |
| 3.04 ± 0.03 | w |
| 2.99 ± 0.02 | w |
| 2.94 ± 0.02 | w |

These values were determined by standard technique. The radiation was the K-alpha doublet of copper, and a diffraction equipped with a scintillation counter and a strip chart pen recorder was used. The peak heights, I, and the positions as a function of two times theta, where theta is the Bragg angle, were read from the spectrometer chart. From these, the relative intensities, 100 $I/I_o$ where $I_o$ is the intensity of the strongest line or peak, and d (obs.), the interplanar spacing in Angstrom units (A) corresponding to the recorded lines, were calculated. In Table 1 the relative intensities are given in terms of the symbols w=weak, s=strong and vs=very strong. Ion exchange of the alkali metal, e.g. sodium, ions with other cations reveals substantially the same pattern with some minor shifts in interplanar spacing and variation in relative intensity. Other minor variations can occur depending on the silicon to aluminum ratio of the particular sample, as well as if it has been subjected to thermal treatment.

While the improved crystalline silicate of the present invention may be used in a wide variety of organic compound, e.g. hydrocarbon compound, conversion reactions, it is notably useful in the processes of hydrocracking, isomerization and reforming. Other conversion processes for which improved zeolite ZSM-5 may be utilized in one or more of its active forms include, for example, cracking and dewaxing.

Synthetic zeolite ZSM-5 prepared in accordance herewith can be used either in the as-synthesized form, the alkali metal form and hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to zeolite ZSM-5 such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction can also be used.

Synthetic zeolite ZSM-5, when employed either as an adsorbent or as a catalyst in a hydrocarbon conversion process, should be dehydrated at least partially. This can be done by heating to a temperature in the range of from about 65° C. to about 550° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized ZSM-5 can be prepared by heating same at a temperature of from about 200° C. to about 550° C. for from 1 hour to about 48 hours.

As above mentioned, synthetic zeolite ZSM-5 prepared in accordance herewith can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths, Mn, Ca, Mg, Zn, Cd, Pd, Ni, Cu, Ti, Al, Sn, Fe and Co.

Typical ion exchange technique would be to contact the synthetic zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

Regardless of the cation replacing the alkali metal in the synthesized form of the zeolite ZSM-5, the spatial arrangement of the aluminum, silicon and oxygen atoms which form the basic crystal lattices of zeolite ZSM-5 remains essentially unchanged by the described replacement of alkali metal as determined by taking an X-ray powder diffraction pattern of the ion-exchanged material.

The crystalline silicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the zeolite ZSM-5 hereby prepared with another material resistant to the temperatures and other conditions employed in certain organic conversion processes. Such matrix materials include active and inactive materials and synthetic or naturally occurring zeolites as well as incorganic materials such as clays, silica and/or metal oxides, e.g. alumina. The latter may be either naturally occurring or in the form of gelatinous precipitates, sols or gels including mixtures of silica and metal oxides. Use of a material in conjuction with the zeolite ZSM-5, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized zeolite ZSM-5 include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite ZSM-5 crystals hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline silicate and matrix vary widely with the crystalline silicate content ranging from about 1 to about 90 percent by weight, and more usually in the range of about 2 to about 50 percent by weight of the composite.

Employing a catalytically active form of the composition of this invention containing a hydrogenation component, reforming stocks can be reformed employing a temperature between 370° C. and 540° C. The pressure can be between 100 and 1000 psig, but is preferably between 200 and 700 psig. The liquid hourly space velocity is generally between 0.1 and 10 $hr^{-1}$, preferably between 0.5 and 4 $hr^{-1}$ and the hydrogen to hydrocarbon mole ratio is generally between 1 and 20, preferably between 4 and 12.

The catalyst can also be used for hydroisomerization of normal paraffins, when provided with a hydrogenation component, e.g. platinum. Hydroisomerization is carried out at a temperature between 90° C. to 370° C., preferably 140° C. to 290° C., with a liquid hourly space velocity between 0.01 and 2 $hr^{-1}$, preferably between 0.25 and 0.50 $hr^{-1}$, employing hydrogen such that the hydrogen to hydrocarbon mole ratio is between 1 and 5. Additionally, the catalyst can be used for olefin or aromatics isomerization employing temperatures between 0° C. and 370° C.

The catalyst can also be used for reducing the pour point of gas oils. This process is carried out at a liquid hourly space velocity between about 10 and about 30 hr$^{-1}$ and a temperature between about 400° C. and about 540° C.

Other reactions which can be accomplished employing the catalyst of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

with stirring, during crystallization for each experiment.

The final product of each experiment was filtered, washed with water, and dried at 110° C.

TABLE 2

| | Reaction Mixture Composition (Mole Ratios) | | | | | Reaction | |
|---|---|---|---|---|---|---|---|
| Experiment | SiO$_2$/ Al$_2$O$_3$ | H$_2$O/ SiO$_2$ | OH$^-$/ SiO$_2$ | Na$^+$/ SiO$_2$ | R/ SiO$_2$ | Time, days | Product |
| 1 | 30 | 40 | 0.40 | 0.46 | 0.20 | 4 | 50% ZSM-5 + 50% Mordenite |
| 2 | 40 | 40 | 0.40 | 0.45 | 0.20 | 4 | 100% ZSM-5 |
| 3 | 60 | 40 | 0.30 | 0.33 | 0.25 | 4 | 60% ZSM-5 + α-cristobalite |
| 4 | 60 | 40 | 0.40 | 0.43 | 0.25 | 4 | 100% ZSM-5 |
| 5 | 60 | 40 | 0.40 | 0.43 | 0.20 | 4 | 100% ZSM-5 |
| 6 | 90 | 40 | 0.30 | 0.32 | 0.20 | 5 | 50% ZSM-5 + α-cristobalite |
| 7 | 90 | 40 | 0.40 | 0.42 | 0.25 | 4 | 80% ZSM-5 + unident. component |
| 8 | 90 | 40 | 0.50 | 0.52 | 0.25 | 4 | 55% ZSM-5 + α-Quartz |
| 9 | 120 | 40 | 0.40 | 0.42 | 0.20 | 4 | 65% ZSM-5 + α-cristobalite |
| 10 | 200 | 40 | 0.40 | 0.41 | 0.20 | 3 | 20% ZSM-5 + unident. component |
| 11 | 400 | 40 | 0.40 | 0.59 | 0.20 | 4 | α-cristobalite only |
| 12 | 400 | 40 | 0.40 | 0.40 | 0.20 | 4 | α-cristobalite only |
| 13 | "infinity" | 40 | 0.30 | 0.59 | 0.15 | 6 | α-cristobalite only |

As-synthesized crystalline products from experiments listed in Table 2 were submitted for chemical analysis and X-ray diffraction analysis. Table 3 lists the analytical compositions of the products from Experiments 2 through 9. Table 4 lists the X-ray diffraction pattern of the as-synthesized product from Experiment 4.

TABLE 3

| | Weight Percent | | | | | | C/N, | Moles Per Mole Al$_2$O$_3$ | | |
|---|---|---|---|---|---|---|---|---|---|---|
| Experiment | C | N | Na | SiO$_2$ | Al$_2$O$_3$ | Ash | Molar Ratio | N$_2$O: | Na$_2$O | SiO$_2$ |
| 2 | 2.00 | 0.7 | 0.85 | 88.8 | 5.4 | 89.66 | 3.3 | 0.47 | 0.35 | 28 |
| 3 | 2.65 | 0.85 | 0.50 | 90.0 | 2.4 | 89.89 | 3.6 | 1.3 | 0.46 | 64 |
| 4 | 2.55 | 0.75 | 0.60 | 90.0 | 2.4 | 90.06 | 4.0 | 1.1 | 0.55 | 64 |
| 5 | 2.05 | 0.72 | 1.15 | 90.0 | 2.3 | 89.67 | 3.3 | 1.1 | 1.11 | 66 |
| 6 | 1.75 | 0.58 | 0.10 | 93.6 | 1.75 | 94.57 | 3.5 | 1.2 | 0.13 | 91 |
| 7 | 3.95 | 1.1 | 1.70 | 76.8 | 2.4 | 84.64 | 4.2 | 1.7 | 1.6 | 54 |
| 8 | 1.66 | 0.58 | 1.15 | 90.0 | 2.4 | 93.42 | 3.3 | 0.88 | 1.06 | 64 |
| 9 | 1.35 | 0.46 | 0.40 | 91.8 | 1.45 | 93.89 | 3.4 | 1.1 | 0.61 | 108 |

In order to more fully illustrate the nature of the invention and the manner of practicing same, the following examples are presented.

EXAMPLES

Experiments listed in Table 2 were conducted to demonstrate the present method for synthesis of crystalline silicate ZSM-5. By the present method of synthesis, it was possible to produce ZSM-5 from an appropriate reaction mixture which did not require costly unreacted organics recovery required with amine or quaternary ammonium compound-directed syntheses.

The directing agent source employed in each experiment was "HEPES" with a molecular weight of 238.3. In Table 2, R represents the anion derived from the directing agent. The other reaction mixture components in experiments 1 through 10 and 12 were silica sol (30% SiO$_2$), NaAlO$_2$ and water. In experiment 11, the other reaction mixture components were Q-Brand sodium silicate (27.8 wt. % SiO$_2$, 8.4 wt. % Na$_2$O and 63.8 wt. % H$_2$O), Al$_2$(SO$_4$)$_3$.16H$_2$O and water. In experiment 13, the other reaction components were Q-Brand sodium silicate and water, with no independent source of added alumina.

In each experiment listed in Table 2, the crystallization time is given together with the resulting crystal-comprising product and its percent crystallinity. The crystallization temperature was maintained at 160° C.,

TABLE 4

| Interplanar d-Spacings(A) | Observed 2 × Theta | Relative Intensities I/I$_o$ |
|---|---|---|
| 11.06083 | 7.987 | 38.3 |
| 9.91322 | 8.913 | 33.4 |
| 9.68208 | 9.126 | 12.3 |
| 7.40993 | 11.934 | 3.7 |
| 6.68326 | 13.237 | 3.4 |
| 6.33644 | 13.965 | 7.7 |
| 5.97819 | 14.806 | 8.7 |
| 5.67947 | 15.590 | 10.2 |
| 5.54964 | 15.957 | 7.3 |
| 4.95792 | 17.876 | 7.0 |
| 4.59998 | 19.280 | 7.1 |
| 4.34825 | 20.407 | 9.0 |
| 4.24991 | 20.885 | 12.8 |
| 4.08344 | 21.746 | 9.6 |
| 3.99681 | 22.224 | 6.7 |
| 3.84618 | 23.106 | 100.0 |
| 3.80579 | 23.354 | 68.9 |
| 3.73594 | 23.797 | 40.4 |
| 3.71067 | 23.962 | 46.8 |
| 3.63637 | 24.459 | 21.2 |
| 3.47419 | 25.620 | 5.6 |
| 3.43223 | 25.938 | 13.2 |
| 3.34779 | 26.604 | 5.6 |
| 3.30250 | 26.976 | 10.9 |
| 3.13292 | 28.466 | 1.7 |
| 3.04276 | 29.328 | 11.6 |
| 2.98554 | 29.903 | 13.8 |
| 2.96540 | 30.111 | 11.1 |
| 2.86051 | 31.243 | 3.5 |
| 2.72847 | 32.797 | 5.9 |

TABLE 4-continued

| Interplanar d-Spacings(A) | Observed 2 × Theta | Relative Intensities $I/I_o$ |
|---|---|---|
| 2.58290 | 34.702 | 1.6 |

What is claimed is:

1. A method for synthesizing a crystalline silicate having the structure of ZSM-5 exhibiting a characteristic X-ray diffraction pattern as shown in Table 1 of the specification, which comprises (i) preparing a mixture capable of forming said silicate, said mixture comprising sources of alkali metal cations (M), an oxide of silicon, an oxide of aluminum, water and an anionic directing agent (R), and having a composition, in terms of mole ratios, within the following ranges:

| $SiO_2/Al_2O_3$ | 20 to less than 400 |
| $H_2O/SiO_2$ | 2 to 1000 |
| $OH^-/SiO_2$ | 0 to 10 |
| $M/SiO_2$ | 0.01 to 4 |
| $R/SiO_2$ | 0.01 to 4 | wherein R is an anion of the formula

(ii) maintaining said mixture under sufficient conditions until crystals of said silicate are formed and (iii) recovering said crystalline silicate having the structure of ZSM-5 from step (ii), said recovered crystalline silicate containing said anion R and alkali metal cations.

2. The recovered crystalline silicate of claim 1.

3. The method of claim 1 wherein said source of anionic directing agent R is the organosulfonic acid N-2-hydroxyethylpiperazine-N-2-ethanesulfonic acid.

4. The method of claim 1 wherein said mixture has a $SiO_2/Al_2O_3$ molar ratio of from about 30 to about 200.

5. The method of claim 4 wherein said source of anionic directing agent R is the organosulfonic acid N-2-hydroxyethylpiperazine-N-2-ethanesulfonic acid.

6. The recovered crystalline silicate of claim 4.

7. The method of claim 4 wherein said mixture has a $SiO_2/Al_2O_3$ molar ratio of from about 40 to about 120.

8. The method of claim 7 wherein said source of anionic directing agent R is the organosulfonic acid N-2-hydroxyethylpiperazine-N-2-ethanesulfonic acid.

9. The recovered crystalline silicate of claim 7.

10. The method of claim 4 comprising replacing alkali metal cations of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

11. The anion R-containing product crystalline silicate of claim 10.

12. The method of claim 10 wherein said replacing cation is hydrogen or a hydrogen precursor.

13. The anion R-containing product crystalline silicate of claim 12.

14. The method of claim 1 wherein said mixture further comprises seed crystals in sufficient amount to enhance synthesis of said crystalline silicate.

15. The method of claim 14 wherein said seed crystals have the structure of ZSM-5.

16. The recovered crystalline silicate of claim 14.

17. The method of claim 1 comprising replacing alkali metal cations of the crystalline silicate recovered in step (iii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

18. The anion R-containing product crystalline silicate of claim 17.

19. The method of claim 17 wherein said replacing cation is hydrogen or a hydrogen precursor.

20. The anion R-containing product crystalline silicate of claim 19.

21. A mixture capable of forming crystals of ZSM-5 structure upon crystallization, said mixture comprising sources of alkaki metal cations (M), an oxide of silicon, an oxide of aluminum, water and anions (R) of the formula:

and having a composition, in terms of mole ratios, within the following ranges:

| $SiO_2/Al_2O_3$ | 20 to less than 400 |
| $H_2O/SiO_2$ | 2 to 1000 |
| $OH^-/SiO_2$ | 0 to 10 |
| $M/SiO_2$ | 0.01 to 4 |
| $R/SiO_2$ | 0.01 to 4 |

22. The mixture of claim 21 wherein said mixture further comprises seed crystals in sufficient amount to enhance synthesis of said ZSM-5.

23. The mixture of claim 21 wherein said $SiO_2/Al_2O_3$ molar ratio is from about 30 to about 200.

24. The mixture of claim 23 wherein said $SiO_2/Al_2O_3$ molar ratio is from about 40 to about 120.

* * * * *